(12) United States Patent
Izawa et al.

(10) Patent No.: US 9,082,529 B2
(45) Date of Patent: Jul. 14, 2015

(54) SHIELD CONDUCTOR

(75) Inventors: Katsutoshi Izawa, Yokkaichi (JP); Masanori Kuwahara, Yokkaichi (JP); Sonoda Fujio, Yokkaichi (JP); Yasushi Itani, Yokkaichi (JP); Yoshinori Sugimoto, Yokkaichi (JP); Naoki Aoyama, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 204 days.

(21) Appl. No.: 13/979,775

(22) PCT Filed: Feb. 28, 2012

(86) PCT No.: PCT/JP2012/054862
§ 371 (c)(1),
(2), (4) Date: Jul. 15, 2013

(87) PCT Pub. No.: WO2012/118051
PCT Pub. Date: Sep. 7, 2012

(65) Prior Publication Data
US 2013/0284487 A1 Oct. 31, 2013

(30) Foreign Application Priority Data
Feb. 28, 2011 (JP) ................. 2011-041362

(51) Int. Cl.
H01B 11/18 (2006.01)
H01B 7/29 (2006.01)
B60R 16/02 (2006.01)

(52) U.S. Cl.
CPC .............. *H01B 7/29* (2013.01); *B60R 16/0215* (2013.01)

(58) Field of Classification Search
CPC ............ H01B 7/20; H01B 7/36; B60R 16/03; Y02T 90/127
USPC ................... 174/102 R, 112, 482; 180/65.31; 307/10.1
See application file for complete search history.

(56) References Cited

U.S. PATENT DOCUMENTS

| | | | |
|---|---|---|---|
| 2005/0011687 A1 | 1/2005 | Yamaguchi et al. |
| 2005/0162015 A1 | 7/2005 | Yamaguchi et al. |

(Continued)

FOREIGN PATENT DOCUMENTS

| | | |
|---|---|---|
| DE | 29807441 | 7/1998 |
| EP | 1440834 | 7/2004 |

(Continued)

OTHER PUBLICATIONS

International Search Report, mail date is Apr. 17, 2012.
Extended European Search Report, dated Jun. 20, 2014, in counterpart EP Patent Application No. 12752348.8.

*Primary Examiner* — Chau N Nguyen
(74) *Attorney, Agent, or Firm* — Greenblum & Bernstein, P.L.C.

(57) ABSTRACT

A shield conductor is provided with electrical wires and a metal pipe that encloses the electrical wires and whose outer peripheral surface is covered with an orange (color other than a metallic color) resin layer. The pipe is routed so that at least a portion passes in proximity to an exhaust pipe of a vehicle. A section of the pipe passing in proximity to the exhaust pipe that faces the exhaust pipe does not have the resin layer and the metallic-colored outer peripheral surface of the section remains exposed.

5 Claims, 5 Drawing Sheets

(56) References Cited

U.S. PATENT DOCUMENTS

| | | | |
|---|---|---|---|
| 2011/0068622 A1* | 3/2011 | Ikeno et al. | 307/10.1 |
| 2011/0232958 A1 | 9/2011 | Yamaguchi et al. | |
| 2013/0235526 A1* | 9/2013 | Watanabe | 361/699 |
| 2013/0241282 A1* | 9/2013 | Ikeno et al. | 307/10.1 |

FOREIGN PATENT DOCUMENTS

| | | |
|---|---|---|
| GB | 905981 | 9/1962 |
| JP | 2002-315138 | 10/2002 |
| JP | 2006-318680 | 11/2006 |
| JP | 2010-143408 | 7/2010 |

* cited by examiner

SHIELD CONDUCTOR

TECHNICAL FIELD

The present invention relates to a shield conductor.

BACKGROUND ART

A known shield conductor used in vehicles such as electric cars and hybrid cars is disclosed in Patent Document 1.

This shield conductor is constituted by a plurality of conducting media housed in a pipe, and is used as a power circuit routed between devices such as an inverter and a motor of the vehicle.

CITATION LIST

Patent Documents

Patent Document 1: JP 2006-318680A

SUMMARY OF INVENTION

Technical Problem

There are cases where the pipe of the shield conductor needs to be colored depending on country-specific standards or the like for reasons such as shield conductors used in vehicles potentially being subject to high voltages (due to high voltage electrical wires (conducting media) being inserted through the shield conductor, etc.). For example, in the U.S., the outer surface of the pipe has to be orange.

Here, to avoid the electric wires in the pipe heating up, the shield conductor is desirably positioned away from the vehicle exhaust pipe which becomes hot, so as to not be exposed to the heat of the exhaust pipe. However, with the increasing component density of vehicles in recent years, it is not always possible to avoid disposing the shield conductor in proximity to the exhaust pipe. In this case, when the shield conductor is a color such as orange, heat from the exhaust pipe is more easily absorbed due to the color, and the electrical wires in the pipe constituting the shield conductor tend to heat up.

The invention was made in view of the above situation, and has as an object to provide a shield conductor that is able to suppress the heating up of the electrical wires in the pipe.

Solution to Problem

The invention is a shield conductor including an electrical wire and a metal pipe that encloses the electrical wire and whose outer peripheral surface is covered with a resin layer of a color other than a metallic color. The pipe is routed so that at least a portion passes in proximity to an exhaust pipe of a vehicle, and a section of the pipe passing in proximity to the exhaust pipe that faces the exhaust pipe does not have the resin layer and a metallic-colored outer peripheral surface of the section is exposed.

Depending on the standards of individual countries or the like, the pipe of shield conductors arranged in a vehicle may have to be colored. In the U.S., for example, the outer surface of the pipe has to be orange. Also, in order to reduce vehicle manufacturing costs, the components of vehicles are desirably standardized. Here, to avoid the heating up of internal electrical wires, the shield conductor is desirably positioned away from the vehicle exhaust pipe which becomes hot. However, with the increasing component density of vehicles in recent years, it is not always possible to avoid disposing the shield conductor in proximity to the exhaust pipe. In this case, when the shield conductor is colored, heat from the exhaust pipe is more easily absorbed due to the color, and the electrical wires in the pipe tend to heat up.

According to this configuration, since the section of the pipe passing in proximity to the exhaust pipe that faces the exhaust pipe does not have the resin layer and the metallic-colored outer peripheral surface remains exposed, the pipe comparatively tend not to absorb heat from the exhaust pipe as a result of the heat being reflected by the metallic-colored section of the pipe, enabling the heating up of the electrical wires in the pipe to be suppressed.

Even when this configuration is adopted, the fact that the pipe is a high temperature pipe can still be identified in the conventional manner, if the section of the outer peripheral surface of the pipe passing in proximity to the exhaust pipe other than the section facing the exhaust pipe is covered with a resin layer that is a color other than a metallic color.

The above configuration more preferably includes any of the following configurations.

(1) Application of a resin coating of a color other than a metallic color as the resin layer.

This enables a color other than a metallic color to be easily applied to the surface of the pipe.

(2) Use of a heat shrinkable tube of a color other than a metallic color as the resin layer.

This enables the outer peripheral surface of a pipe to be protected by the heat shrinkable tube.

(3) Arrangement of the section of the pipe whose metallic-colored outer peripheral surface is exposed in the engine compartment of the vehicle.

(4) Arrangement of the section of the pipe whose metallic-colored outer peripheral surface is exposed under the floor of the vehicle.

Advantageous Effects of Invention

The invention enables the heating up of electrical wires in a pipe of a shield conductor to be suppressed.

DESCRIPTION OF EMBODIMENTS

Embodiment 1

Embodiment 1 of the invention will be described with reference to FIGS. 1 to 3.

Figure 1:
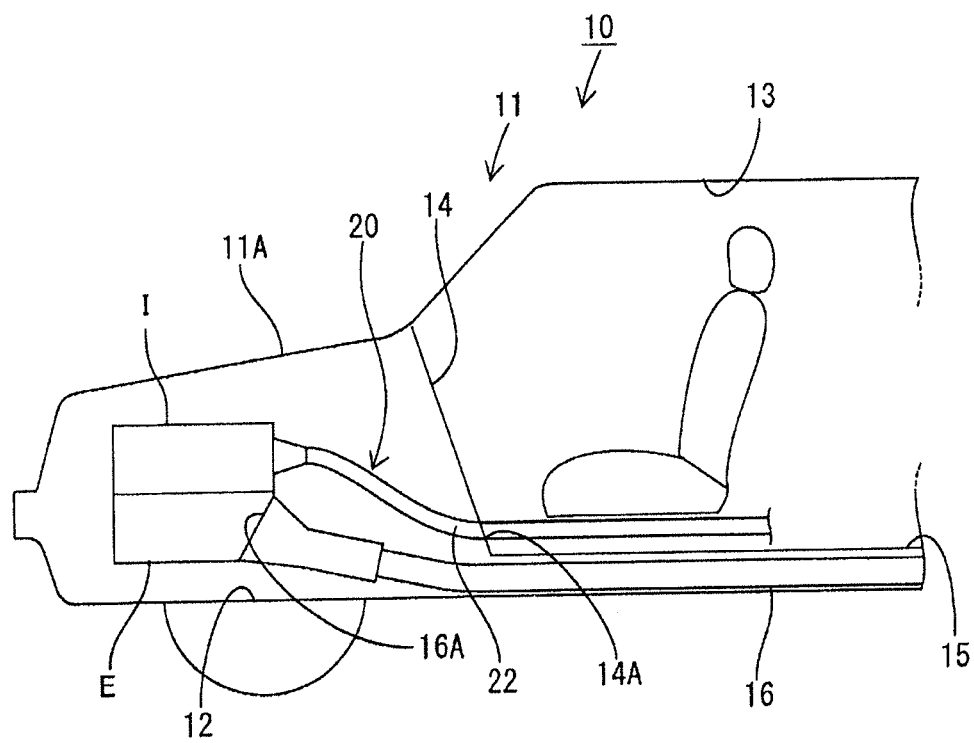
FIG. 1 is a schematic diagram representing a state where a shield conductor of Embodiment 1 is routed in a vehicle.

A shield conductor is, as shown in FIG. 1, routed between devices such as a battery B, an inverter I, and an unshown motor (and generator) that constitute a drive power circuit in a vehicle 10 such as a hybrid car or an electric car. In the present embodiment, an example is described in which a shield conductor 20 is routed between the inverter I and the battery B of the vehicle 10. Hereinafter, in the present embodiment, the up and down directions are the same as in FIG. 1, and the frontward and rearward directions are respectively to the left side and right side in FIG. 1.

The vehicle 10 is, for example, a hybrid car. An engine compartment 12 is provided in a front portion of a body 11, and an interior 13 which is the area used by the driver is rearward of the engine compartment 12.

The engine compartment 12 is provided under a bonnet 11A and is partitioned from the interior 13 by a plate-like partition 14. A lower portion of the interior 13 is partitioned from the outside by a floor plate 15 that is continuous with a lower end of the partition 14. The partition 14 has an insertion hole 14A through which (a pipe 22 of) the shield conductor 20 is inserted.

The engine compartment 12 houses a gasoline-driven engine E, and the inverter I and the unshown drive motor (generator) are housed side-by-side above the engine E.

Exhaust gas discharged from respective cylinders of the engine E passes through a plurality of opening ends 16A provided side-by-side at one end of an exhaust pipe 16 that is connected to the opening ends 16A in a continuous manner, and is directed outside the vehicle at the other end (not shown) of the exhaust pipe 16. The plurality of opening ends 16A of this exhaust pipe 16 collect into one, and the exhaust pipe 16 then extends rearward at a slightly downward angle through the engine compartment 12, and is directed outside the vehicle from near the lower end of the partition 14 while following the bottom of the floor plate 15 substantially horizontally.

Note that the exhaust pipe 16 is fixed to the bottom of the floor plate 15 with a fixture that is not shown. Also, the battery B and a rear-wheel drive motor (not shown) are disposed in a back portion of the body 11.

The inverter I and the battery B are connected by the shield conductor 20. The shield conductor 20 is, as shown in FIG. 3, configured by inserting two electrical wires 21 through a cylindrical pipe 22.

The electrical wires 21 are configured by enclosing the outer periphery of a conductive core consisting of a twisted wire formed by twisting together a large number of metal (e.g., aluminum alloy, copper alloy, etc.) strands with a synthetic resin insulating cover (insulating layer), without providing a shield layer. A terminal fitting is connected to a terminal end of the electrical wires 21, and the electrical wires 21 are connected to terminals of the inverter I and the battery B using these terminal fittings.

Note that, in the present embodiment, there are two electrical wires 21 because the shield conductor 20 is routed between the battery B and the inverter I. However, the shield conductor may be provided with three electrical wires 21 capable of transmitting three-phase AC power if the shield conductor is also routed between the inverter I and a front-wheel drive or rear-wheel drive motor (generator).

The pipe 22 is a metal (e.g., aluminum, aluminum alloy, copper, copper alloy, stainless steel, etc.) pipe, and is elongated so as to produce a shield function by enclosing the electrical wires 21 along substantially their entire length except for the front and back ends of the electrical wires 21.

Figure 2:
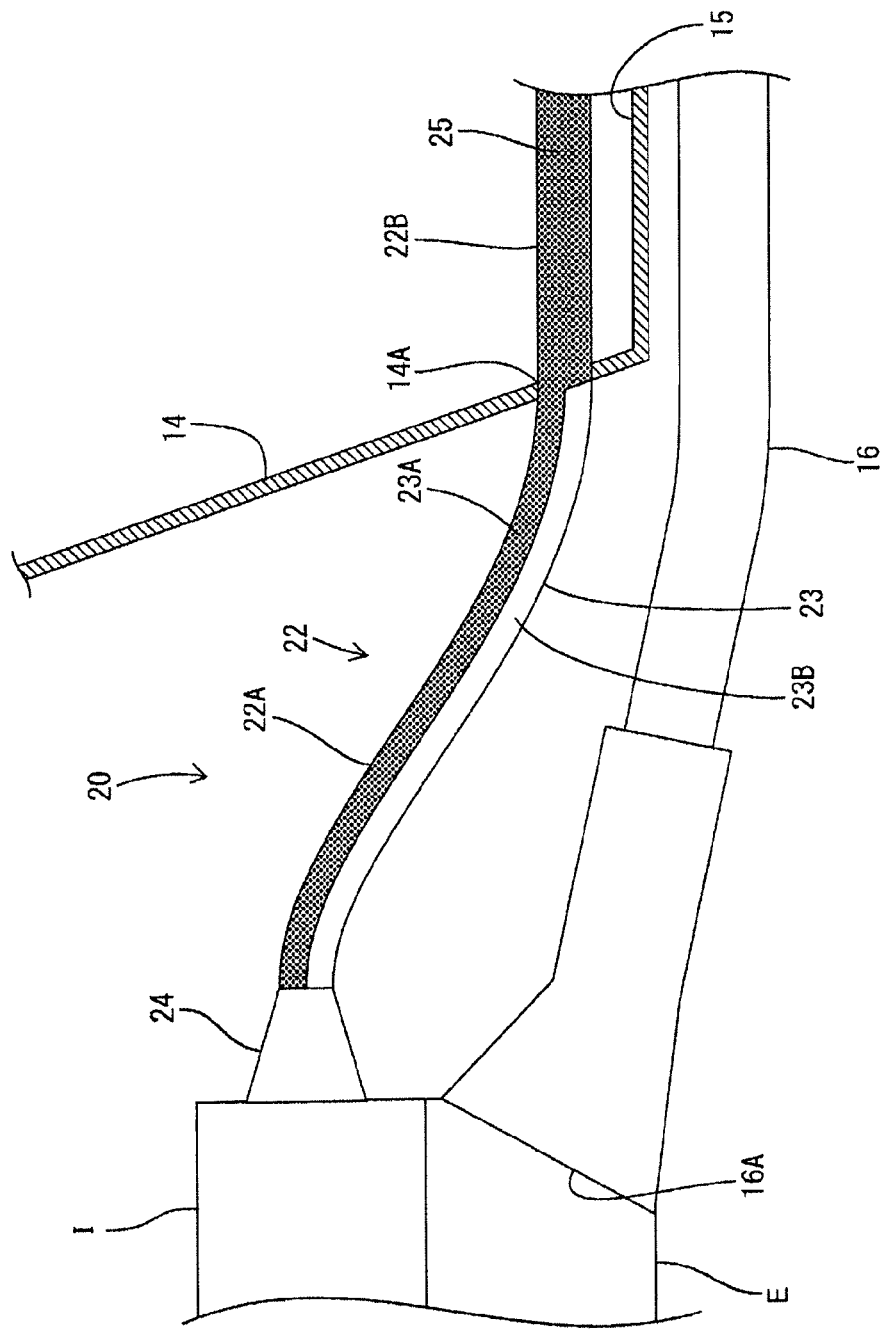
FIG. 2 is an enlarged diagram of an exhaust pipe and the shield conductor in proximity thereto.
Figure 3:
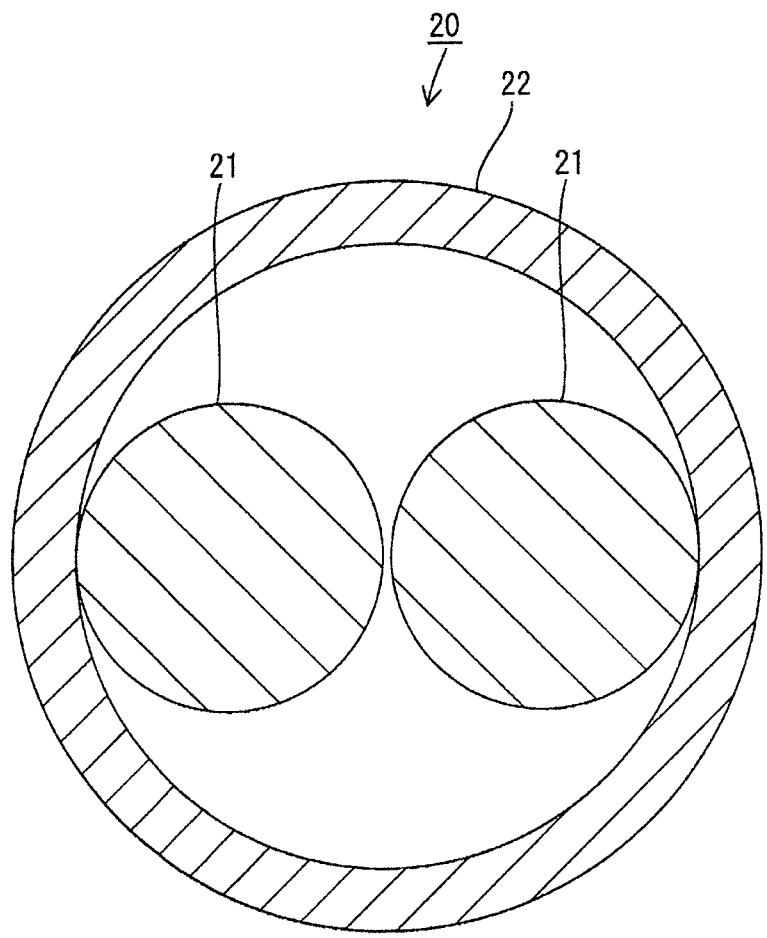
FIG. 3 is a cross-sectional view of the shield conductor.

As shown in FIG. 2, the full length of this pipe 22 is divided into a first conductive portion 22A arranged in the engine compartment 12 (frontward of the partition 14) and a second conductive portion 22B arranged in the interior 13 (rearward of the partition 14) continuously with the rearward end of the first conductive portion 22A.

The first conductive portion 22A consists of a cylindrical main body 23 and a connecting portion 24 having a braided wire formed by weaving thin metal wires into mesh structure and being mounted on the front end of the main body 23. The pipe 22 is attached to the case of the inverter I via the connecting portion 24 with the braided wire fitted onto the pipe 22. Note that the pipe 22 and the braided wire can be connected by means such as welding, soldering, or swaging using a swage ring.

The main body 23 extends to the insertion hole 14A in the partition 14 at a downward angle from the connecting portion 24. The main body 23 is thereby disposed so as to pass in proximity to the exhaust pipe 16 and follow the exhaust pipe 16.

Note that "in proximity" to the exhaust pipe 16 means that the pipe 22 and the exhaust pipe 16 are close enough for the allowable current of the internal electrical wires 21 to be affected due to the pipe 22 being exposed to the heat of the exhaust pipe 16.

Here, the upper half (180 degree area on far side from exhaust pipe 16) of the circular outer periphery of the main body 23 is a colored portion 23A whose metal surface has been painted orange with a synthetic resin paint (resin coated with an orange resin layer (note that although this area is represented with a large number of dots in FIG. 2, the resin layer is formed uniformly (in monochrome) over the entire colored portion)). On the other hand, the lower half (180 degree area on near side to exhaust pipe 16) of the circular outer periphery is a non-colored portion 23B that has not been painted and whose outer peripheral surface is the original metallic color (metal surface of pipe 22 has not been resin coated with a resin layer and remains exposed).

The second conductive portion 22B is attached so as to follow the top of the floor plate 15 (i.e., separated from the exhaust pipe 16 by the floor plate 15), and is directed to an unshown battery on the rearward side.

This second conductive portion 22B is a colored portion 25 whose metal surface is painted orange with a synthetic resin paint around the entire circular outer periphery (360 degree area) thereof (resin coated with a resin layer).

The present embodiment achieves the following effects. In a shield conductor 20 provided with electrical wires 21 and a metal pipe 22 that encloses the electrical wires 21 and whose outer peripheral surface is covered with an orange (color other than a metallic color) resin layer, the pipe 22 is routed so that at least a portion passes in proximity to an exhaust pipe 15 of the vehicle and at least a portion passes in proximity to an exhaust pipe 16 of the vehicle, and a section of the pipe 22 passing in proximity to the exhaust pipe 16 that faces the exhaust pipe 16 is a non-colored portion 23B that is not covered with a resin layer and whose metallic-colored metal surface remains exposed.

Thus, according to the present embodiment, since the section of the pipe 22 passing in proximity to the exhaust pipe 16 that faces the exhaust pipe 16 is a non-colored portion 23B that does not have a resin layer and whose metallic-colored outer peripheral surface remains exposed, the pipe 22 comparatively tends not to absorb heat from the exhaust pipe 16 as a result of the heat being reflected by the metallic-colored section of the pipe 22, enabling the heating up of the electrical wires in the pipe 22 to be suppressed.

Even when this configuration is adopted, the fact that the pipe 22 is a high temperature pipe 22 can still be identified in the conventional manner, by configuring the section of the pipe 22 passing in proximity to the exhaust pipe 16 other than the section that faces the exhaust pipe 16 as a colored portion 23A that is covered with an orange (color other than a metallic color) resin layer.

(2) Since the resin layer is an orange (color other than a metallic color) resin coating, a color other than a metallic color can be easily applied to the surface of the pipe.

Embodiment 2

Embodiment 2 of the invention will be described with reference to FIGS. 4 and 5.

In Embodiment 2, a shield conductor 40 is routed under the floor of a vehicle 50 (underside of floor plate 15 facing the road).

Note that the same reference signs are given to constituent elements that are the same as Embodiment 1, and description thereof will be omitted. Also, in the following description, the frontward and rearward directions are respectively to the left side and right side in FIG. 4.

Figure 4:
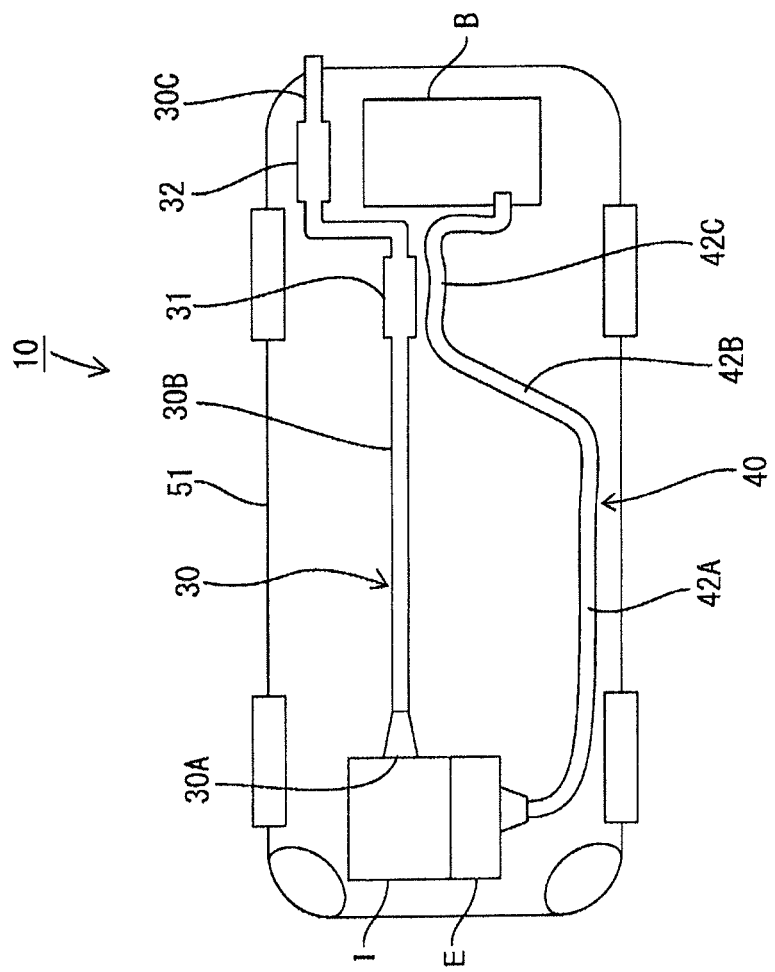
FIG. 4 is a schematic diagram representing a state where a shield conductor of Embodiment 2 is routed under the floor of a vehicle.

The vehicle 50 is, for example, a hybrid car, and, as shown in FIG. 4, the engine compartment is provided in a front portion of a body 51. A gasoline-driven engine E is housed in the approximate center of the engine compartment, and an unshown drive motor (generator) and an inverter I are housed so as to be stacked one on top of the other to one side of the engine E.

A plurality of opening ends 30A at one end of an exhaust pipe 30 are connected to the engine E, and the other end of the exhaust pipe 30 is directed outside the vehicle.

This exhaust pipe 30 consists of a first extended portion 30B that is directed under the floor of the vehicle (underside of floor plate 15) at a downward angle from the opening ends 30A and thereafter extends in a straight line, and a second extended portion 30C that is bent in a crank shape from the end of the first extended portion 30B and directed to the rearward end of the vehicle 50.

Mufflers 31 and 32 whose outer diameter protrudes in a stepped manner are respectively provided at the back end of the first extended portion 30B and in a section of the second extended portion 30C that is parallel with the first extended portion 30B.

The exhaust pipe 30 is fixed to the floor plate 15 by a fixture that is not shown.

The battery B and a rear-wheel drive motor (not shown) are disposed in a back portion of the body 11.

The inverter I and the battery B are connected by the shield conductor 40.

The shield conductor 40 is configured by inserting two electrical wires 21 through a cylindrical pipe 42, similarly to Embodiment 1.

The pipe 42 is a metal (e.g., aluminum alloy, copper alloy, stainless steel, etc.) pipe, and is provided at a length that produces a shield function by covering the electrical wires 21 along substantially their entire length except for the front and back ends of the electrical wires 21.

Specifically, the pipe 42 consists of a distant portion 42A that passes at a distance to the exhaust pipe 30, a middle connecting portion 42B that is continuous with the distant portion 42A and approaches the exhaust pipe 30, and a proximal portion 42C that is continuous with the middle connecting portion 42B and passes in proximity to the exhaust pipe 30.

The distant portion 42A is directed to one side of vehicle from a lateral face of the inverter I, and extends rearward along the side of the vehicle.

The middle connecting portion 42B and the proximal portion 42C may be required in the case where, for example, the pipe 22 cannot extend directly rearward in a straight line from the distant portion 42A to the battery B given restrictions on the placement of the pipe 22 (shield conductor 40) due to various factors such as the need to secure space for a rear-wheel drive motor.

In the present embodiment, the middle connecting portion 42B slopes at a predetermined angle, and the proximal portion 42C is provided so as to follow (at a distance) the first extended portion 30B in proximity to the muffler 31 provided at the back end of the first extended portion 30B of the exhaust pipe 30. The rearward end of the proximal portion 42C curves (bends) according to the position of the terminals of the battery B and is connected to the battery B.

Note that "in proximity" to the exhaust pipe 30 as referred to here means that the pipe 42 and the exhaust pipe 30 are close enough for the allowable current of the internal electrical wires 21 to be affected due to the pipe 42 being exposed to the heat of the exhaust pipe 30.

Figure 5:
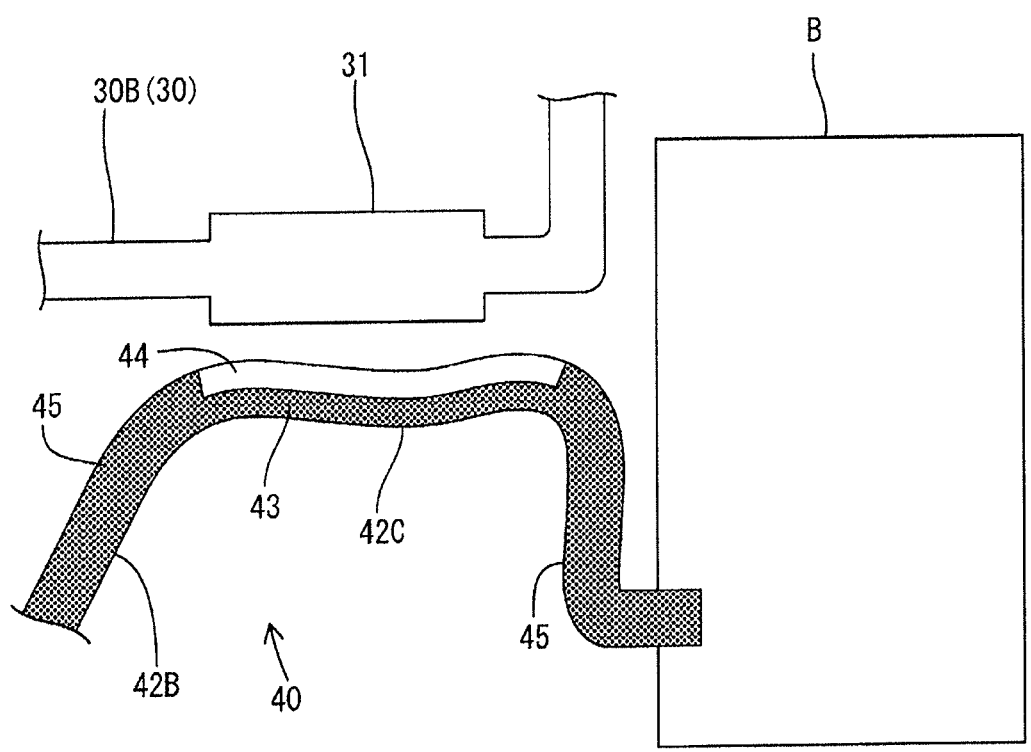
FIG. 5 is an enlarged diagram of an exhaust pipe and the shield conductor in proximity thereto.

The section of the pipe 42 other than proximal portion 42C (distant portion 42A and middle connecting portion 42B) is given as a colored portion 45 whose metal surface is painted orange with a synthetic resin paint over the entire circumference thereof (resin coated with a resin layer (note that although this area is represented with a large number of dots in FIG. 5, the resin layer is formed uniformly (in monochrome) over the entire colored portion)).

As shown in FIG. 5, the left half of the circular outer periphery (lower half in FIG. 5; 180 degree area on far side from exhaust pipe 30) of the proximal portion 42C is given as a colored portion 43 whose metal surface is painted orange with a synthetic resin paint (resin coated with a resin layer). On the other hand, the right half of the circular outer periphery (upper half in FIG. 5; 180 degree area on near side to exhaust pipe 30) is given as a non-colored portion 44 that has not been painted and whose outer surface is not colored and is the original metallic color (metal surface of pipe 22 has not been resin coated with a resin layer and remains exposed).

Embodiment 3

Embodiment 3 of the invention will be described. In Embodiment 3, the section of the outer peripheral surface of the pipe that is a color other than a metallic color in the above embodiments is configured by coloring the outer peripheral surface of the pipe orange through covering the unpainted metallic-colored pipe with an orange heat shrinkable tube. Hereinafter, description of constituent elements that are the same as the above embodiments will be omitted.

This shield conductor is formed by passing the unpainted metallic-colored pipe through a cylindrical heat shrinkable tube (having a large preshrink diameter and from which the non-colored section has already been removed), and then heating and shrinking the heat shrinkable tube. The heat shrinkable tube is thereby adhered to the outer peripheral surface of the pipe.

Adhering the heat shrinkable tube to the outer peripheral surface of the pipe thus enables the outer peripheral surface of the pipe to be protected by the heat shrinkable tube.

Other Embodiments

The invention is not limited to the embodiments described using the above description and drawings, and embodiments such as the following, for example, are also encompassed within the technical scope of the invention.

(1) In the above embodiments, a configuration was adopted in which two electrical wires 21 were inserted through the pipe 22 (42). However, the invention is not limited thereto, and one electrical wire 21 or three or more electrical wires 21 may be inserted through the pipe.

(2) The non-colored portion 23B (44) where the pipe 22 (42) is not colored is not limited to the position described in the above embodiments, and can be located anywhere in proximity to the exhaust pipe 16 (30). Accordingly, the position of the non-colored portion 23B (44) can be varied according to factors such as the shape of the exhaust pipe and the placement of the shield conductor (structural restrictions on placement).

(3) In the above embodiments, a configuration was adopted in which the color applied to the colored portion 23A (43) was orange in compliance with U.S. standards. However, the invention is also applicable to shield conductors in which the colored portion 23A (43) is another color.

REFERENCE SIGNS LIST 10, 50 Vehicle
11, 51 Body
12 Engine compartment
13 Interior
14 Partition
15 Floor plate
16, 30 Exhaust pipe
16A, 30A Opening end
20, 40 Shield conductor
21 Electrical wire
22, 42 Pipe
23 Main body
23A, 43 Colored portion
23B, 44 Non-colored portion
24 Connecting portion
31, 32 Muffler
42A Distant portion
42B Middle connecting portion
42C Proximal portion
B Battery
I Inverter

The invention claimed is:

1. A shield conductor comprising:
an electrical wire; and
a metal pipe that encloses the electrical wire and whose outer peripheral surface is covered with a resin layer of a color other than a metallic color,
wherein the pipe is routed so that at least a portion of the pipe passes in proximity to an exhaust pipe of a vehicle, and
a section of the pipe passing in proximity to the exhaust pipe and that faces the exhaust pipe does not have the resin layer thereon, such that a metallic-colored outer peripheral surface of the section of the pipe is exposed.

2. The shield conductor according to claim 1, wherein the resin layer is a resin coating of a color other than a metallic color.

3. The shield conductor according to claim 1, wherein the resin layer is a heat shrinkable tube of a color other than a metallic color.

4. The shield conductor according to claim 1, wherein the section of the pipe whose metallic-colored outer peripheral surface is exposed is arranged in an engine compartment of the vehicle.

5. The shield conductor according to claim 1, wherein the section of the pipe whose metallic-colored outer peripheral surface is exposed is arranged under a floor of the vehicle.

* * * * *